(12) United States Patent
Cooray et al.

(10) Patent No.: US 8,906,526 B2
(45) Date of Patent: Dec. 9, 2014

(54) ELECTROLYTE COMPOSITION, SOLID ELECTROLYTE MEMBRANE, SOLID POLYMER FUEL CELL AND MANUFACTURING METHOD FOR SOLID ELECTROLYTE MEMBRANE

(75) Inventors: Nawalage Florence Cooray, Kawasaki (JP); Fumio Takei, Kawasaki (JP); Masao Tomoi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1008 days.

(21) Appl. No.: 12/944,270

(22) Filed: Nov. 11, 2010

(65) Prior Publication Data
US 2011/0070525 A1    Mar. 24, 2011

Related U.S. Application Data

(62) Division of application No. 11/363,942, filed on Mar. 1, 2006, now Pat. No. 7,858,215, which is a division of application No. 11/169,143, filed on Jun. 29, 2005, now Pat. No. 7,037,614.

(30) Foreign Application Priority Data

Mar. 28, 2005   (JP) .................................. 2005-92794

(51) Int. Cl.
H01M 8/10    (2006.01)
(52) U.S. Cl.
USPC ............ 429/33; 429/310; 429/314; 252/62.2; 521/27; 525/326.2
(58) Field of Classification Search
USPC .......... 429/33, 310, 314; 252/622; 525/326.2; 521/27
See application file for complete search history.

(56) References Cited

U.S. PATENT DOCUMENTS

| | | | |
|---|---|---|---|
| 5,225,515 A | * | 7/1993 | Lysenko et al. ............... 528/125 |
| 5,702,755 A | | 12/1997 | Mussell |
| 5,869,416 A | | 2/1999 | Mussell |
| 5,882,810 A | | 3/1999 | Mussell et al. |
| 6,096,234 A | | 8/2000 | Nakanishi et al. |
| 6,099,988 A | | 8/2000 | Savinell et al. |

(Continued)

FOREIGN PATENT DOCUMENTS

| | | |
|---|---|---|
| JP | 6-199959 A | 7/1994 |
| JP | 2001-189155 A | 7/2001 |

(Continued)

OTHER PUBLICATIONS

Jin et al., "Polybenzimidazoles from perfluorocyclobutyl monomers", PMSE Preprints, 91, Journal American Chemical Society, pp. 504-505, 2004. (No Month).

*Primary Examiner* — Peter D. Mulcahy
*Assistant Examiner* — Henry Hu
(74) *Attorney, Agent, or Firm* — Westerman, Hattori, Daniels & Adrian, LLP

(57) ABSTRACT

An electrolyte composition that shows low methanol crossover and exhibits high proton conductivity when used as a solid electrolyte for solid polymer fuel cells or the like, and a solid electrolyte membrane and a solid polymer fuel cell that use the electrolyte composition are provided. This electrolyte composition comprises a perfluorocyclobutane-containing polymer having a specific structure. High proton conductivity is provided by sulfonic acid groups connected to the benzene rings. Reduction of methanol crossover is realized by introduction of a rigid structure with aromatic rings, or a combination o a rigid structure with aromatic rings and a three-dimensional cross-linked structure.

15 Claims, 10 Drawing Sheets

Structure of Micro Fuel Cell

(56) References Cited

U.S. PATENT DOCUMENTS

| | | |
|---|---|---|
| 6,312,845 B1 | 11/2001 | Scortichini et al. |
| 6,559,237 B1 * | 5/2003 | Mao et al. ................ 525/326.2 |
| 6,607,856 B2 * | 8/2003 | Suzuki et al. ................ 429/483 |
| 7,037,614 B1 * | 5/2006 | Cooray et al. ................ 429/494 |
| 7,038,004 B2 * | 5/2006 | Chen et al. ................ 528/86 |
| 7,858,215 B2 * | 12/2010 | Cooray et al. ................ 429/494 |

FOREIGN PATENT DOCUMENTS

| | | |
|---|---|---|
| JP | 2003-535929 A | 12/2003 |
| WO | 01/94427 A1 | 12/2001 |
| WO | WO-01/94427 A1 * | 12/2001 |

* cited by examiner

FIG. 1
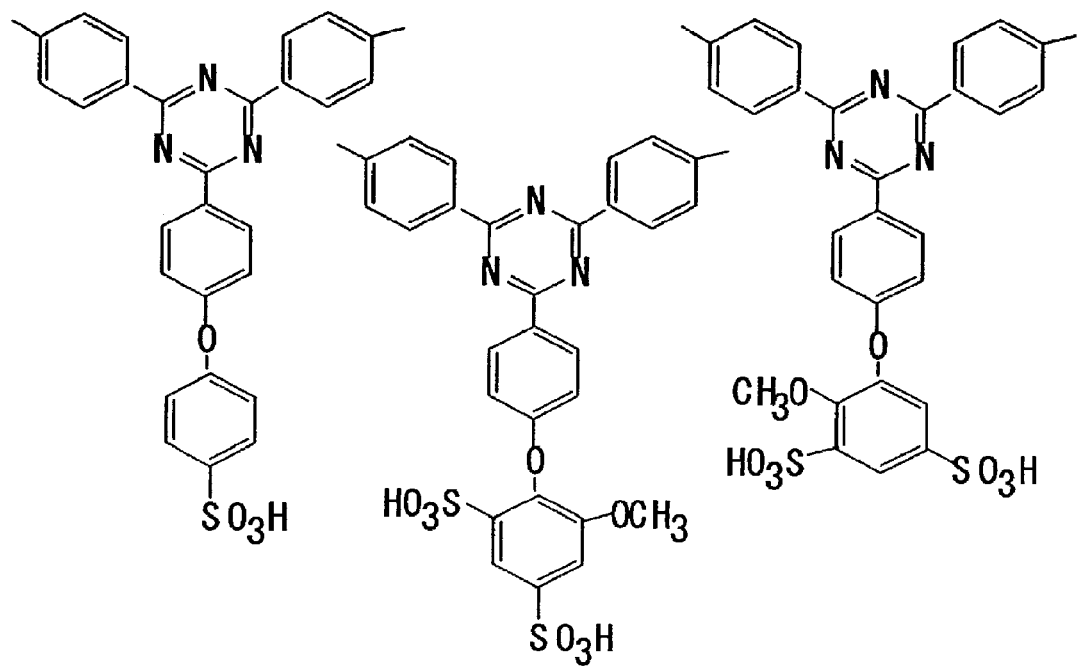
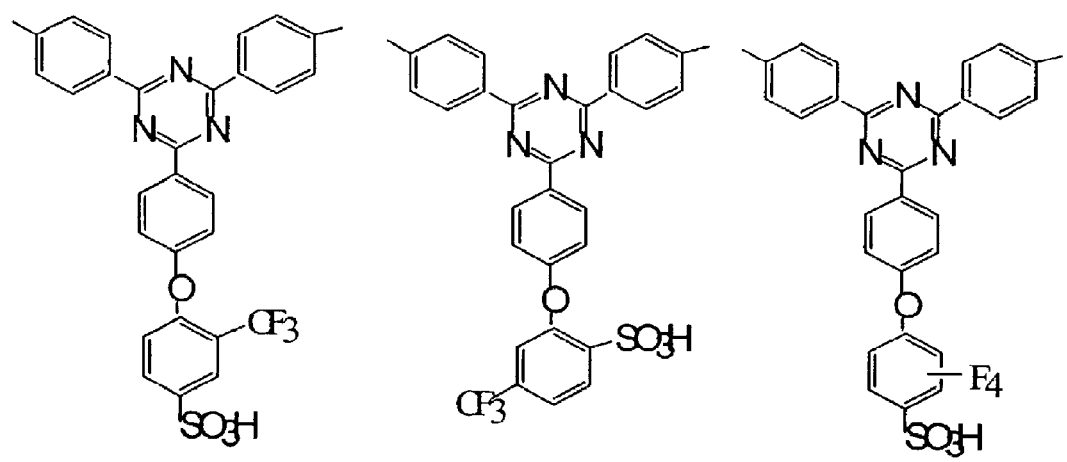

FIG. 3
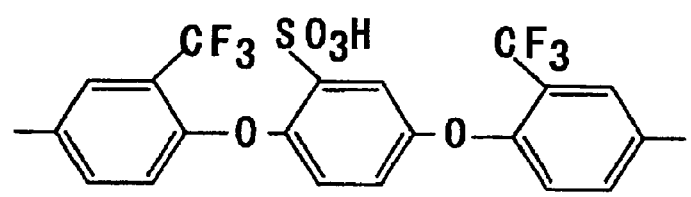
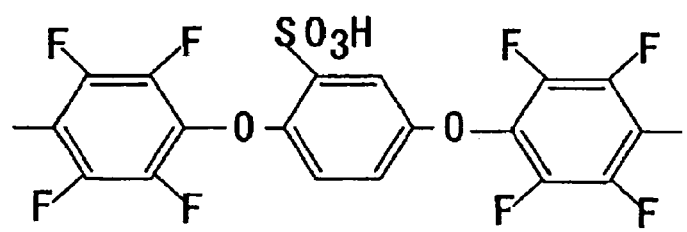

FIG. 4  Reaction Scheme - Monomers

Polymer 11 (n/m=10)

Polymer 12 (n/m=10)

ELECTROLYTE COMPOSITION, SOLID ELECTROLYTE MEMBRANE, SOLID POLYMER FUEL CELL AND MANUFACTURING METHOD FOR SOLID ELECTROLYTE MEMBRANE

CROSS-REFERENCE TO RELATED APPLICATIONS

This application is a divisional of application Ser. No. 11/363,942, filed on Mar. 1, 2006, now U.S. Pat. No. 7,858, 215, which is a divisional of application Ser. No. 11/169,143, filed on Jun. 29, 2005, now U.S. Pat. No. 7,037,614, which are based upon and claim the benefit of priority from the prior Japanese application No. 2005-092794, filed on Mar. 28, 2005, the entire contents of all are incorporated herein by reference.

BACKGROUND OF THE INVENTION

1. Field of the Invention

The present invention relates to a proton conductive solid electrolyte membrane for solid polymer fuel cells. To be more concrete, the present invention relates to a solid electrolyte membrane for methanol fuel cells (or direct methanol fuel cells that will be also called DMFCs) or hydrogen fuel cells.

2. Description of the Related Art

Solid electrolyte membranes are indispensable materials for electrochemical elements such as solid polymer fuel cells, temperature sensors, gas sensors, electrochromic devices, etc. Among these uses, solid polymer fuel cells are expected to play a major role in future new energy-technologies. When a solid electrolyte membrane is used for a fuel cell, it is often called a proton conductive membrane, since it plays a role of conducting protons.

Among solid polymer fuel cells, methanol fuel cells are expected to be promising as a power source for electric automobiles, since methanol can be supplied as a liquid fuel, similar to gasoline. Also, due to its ease of handling, methanol fuel cells are expected to be promising as an energy source for electric/electronic portable devices.

Methanol fuel cells are classified into two types: reforming-type cells in which methanol is converted into a gas mixture mainly composed of hydrogen, using a reformer; and DMFC's that directly use methanol without using a reformer. Among them, practical applications of DMFCs in portable electric/electronic devices are highly expected, because compact and light-weight devices can be realized since no reformer is necessary in these cell systems.

Organic polymer materials having sulfonic acid groups, carboxylic groups, phosphoric groups and the like are used as solid electrolyte membranes of fuel cells. Conventionally, perfluorosulfonic acid polymers such as Nafion® membrane of Du Pont and Dow membrane of Dow Chemical have been widely used as such organic polymer materials.

However, the problem with these membranes is that although they have excellent proton conductivity, there is a strong tendency for the methanol, which has a high affinity for water, to permeate from the anode side to the cathode side (methanol crossover), when they are used as solid electrolyte membranes of DMFCs. When methanol crossover occurs, the supplied fuel (methanol) directly reacts with oxygen at the cathode, thus making it unable to output energy as electricity.

Proton conductive membranes that are not affected by the water content in them are considered to have low methanol crossover. However, for example, in the case of polybenzimidazoles (PBIs) doped with strong acids such as phosphoric acid, although the methanol crossover is low, there is a problem that inorganic dopants leach out from the membrane into water/methanol solutions.

Attention has been focused on sulfonated polyphenylene ethers, polyether ketones, polyimides, polybenzoxazoles, polybenzothiazoles and the likes as materials capable of controlling methanol crossover (see, for example, Japanese Patent Application Laid-open No. 2002-201269 (Claims, and paragraph No. 2-4)). The major problem of these polymers is that sufficient proton conductivity could not be obtained, since they do not form appropriate ion channel structures. Also, they undergo chemical degradation in strong acidic and oxidative conditions, through the CH bonds of these materials.

At present, perfluorinated resins such as Nafion are indispensable materials as binders of electrode layers of fuel cells. Accordingly, it is essential to develop an electrolyte membrane with some elastic properties in order to improve the compatibility with the aforementioned perfluorinated binders, thereby to realize good adhesion between the membrane and the electrode layers. Furthermore, polymer structures with least number of CH, $CH_2$, $CH_3$, and $CO_2R$ groups are necessary to improve the oxidative stability of the membrane, or in other words, it is essential to develop materials with molecular structures having perfluoroalkylenes, fluorinated phenyl groups, sulfones, carbonyl groups, or the like. Moreover, in order to control methanol crossover, introduction of a cross-linked structure is indispensable.

Regarding fluorinated proton conductive materials other than Nafion, sulfonated perfluorocyclobutane-containing polymers having proton conductivities superior than that of Nafion, and their fuel cell properties (PEM) have been disclosed (see U.S. Pat. No. 6,559,237 (claims). Furthermore, use of porous perfluorocyclobutylene polymers to support the electro-conductive particles of the electrode binders and to facilitate gas permeation in electrodes of fuel cells have been disclosed in U.S. Pat. No. 5,620,807 (claims). However, they have not disclosed the use of perfluorocyclobutylene polymers as proton conductive membranes.

In addition, according to the reported method for synthesizing perfluorocyclobutane-containing sulfonated polymers, first perfluorocyclobutane-containing polymers have been synthesized from non-sulfonated monomers and then they have been converted to sulfonated perfluorocyclobutane-containing polymers by direct sulfonation using chlorosulfonic acid. It should be mentioned that in this method of sulfonation, it is difficult to control the degree of sulfonation depending on the molecular structure, and sometimes the sulfonation reaction does not proceed at all.

SUMMARY OF THE INVENTION

It is an object of the present invention to provide an electrolyte composition that can furnish good adhesion to perfluorinated resins such as Nafion, that are used in the binders of electrode layers of fuel cells, and shows excellent resistance to acids and oxidative conditions, low methanol crossover, and high proton conductivity, when used as solid electrolytes for solid polymer fuel cells or the like. Other objectives and advantages of the present invention will be made clear from the following explanation.

According to one aspect of the present invention, provided is an electrolyte composition comprising a perfluorocyclobutane-containing polymer having a structural unit represented by formula (1),

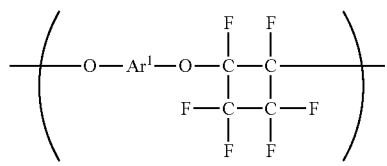
(1)

(in formula (1), $Ar^1$ is a structural unit represented by formula (2), (3) or (4)),

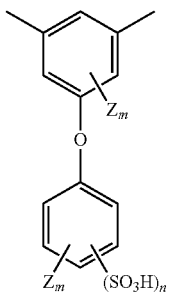
(2)

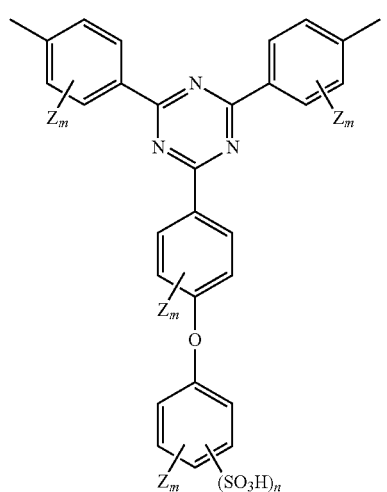

-continued (3)

(4)

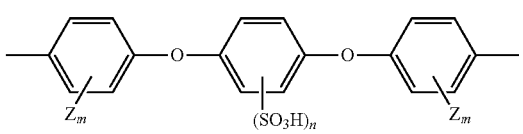

(in formulae (2), (3) and (4), Z's are, independent from each other, F or $CF_3$; m's are, independent from each other, an integer of not less than 0 on each benzene ring; and n's are, independent from each other, an integer of not less than 1).

Preferable are that the structural unit represented by the formula (1) is obtained by chemical reaction of a compound represented by formula (5),

$F_2C=FC\text{-}0\text{-}Ar^1\text{-}0\text{-}CF=CF_2$ (5)

(in formula (5), $Ar^1$ is the same as $Ar^1$ of formula (1)); that the perfluorocyclobutane-containing polymer further comprises a structural unit represented by formula (6),

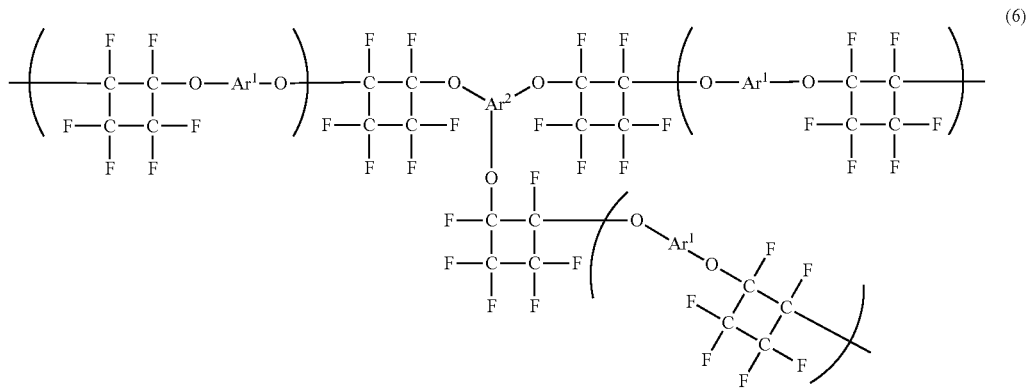
(6)

(in formula (6), Ar$^1$'s are, independent from each other and independently from Ar$^1$ of formula (1), a structural unit represented by formula (2), (3) or (4); and Ar$^2$ is a structural unit represented by formula (7), (8) or (9)),

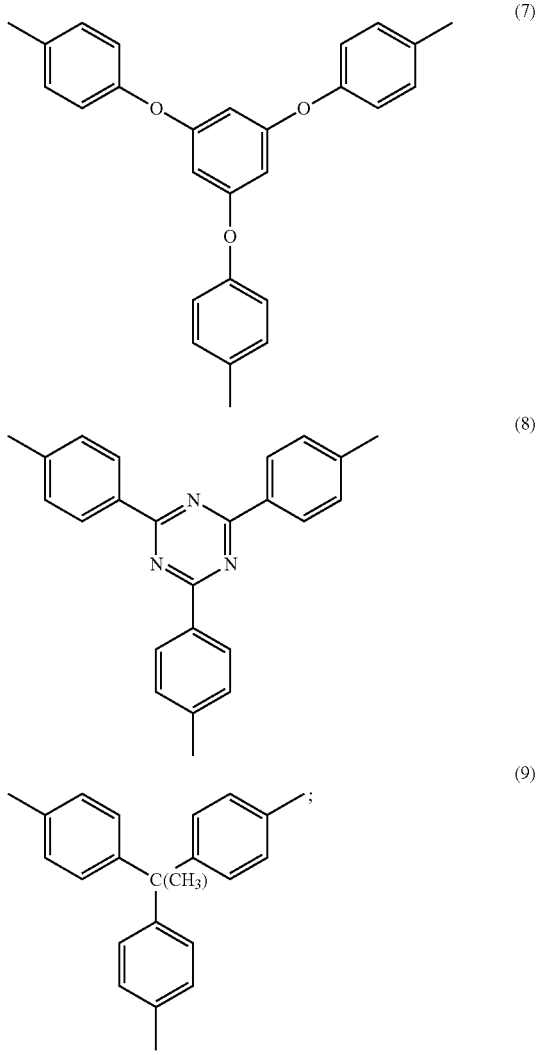

that the structural unit represented by the formula (6) is obtained by chemical reaction of a compound represented by formula (10) with a compound represented by formula (5),

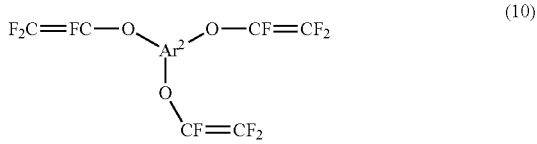

(in formula (10), Ar$^2$ is the same as Ar$^2$ of formula (6); and in formula (5), Ar$^1$ is the same as Ar$^1$ of formula (1)); that the perfluorocyclobutane-containing polymer has a number average molecular weight Mn in the range of from 5,000 to 10,000,000; that the perfluorocyclobutane-containing polymer is a homopolymer, a random copolymer, a block copolymer or a mixture thereof; and that Ar$^1$ comprises one or two sulfonic acid groups.

According to this aspect of the present invention, it is possible to obtain an electrolyte composition that shows low methanol crossover, and high proton conductivity, when used for a solid electrolyte for a solid polymer fuel cell or the like. Good adhesion to a perfluorinated resin (Nafion) in the capacity of a binder of an electrode layer of a fuel cell and excellent resistance to acids and oxidative conditions can also be realized. Furthermore, by using this electrolyte composition, it is possible to make a solid electrolyte membrane and a solid polymer fuel cell that show excellent resistance to acids, low methanol crossover, and high proton conductivity.

According to another aspect of the present invention, provided is a method for manufacturing a solid electrolyte membrane wherein the above-described electrolyte composition comprises an organic solvent or a mixture of solvents, the electrolyte composition comprising the organic solvent is applied onto a substrate, and then, the solvent is removed. It is preferable to carry out a hot-press rolling treatment after the removal of the solvent.

According to this aspect of the present invention, it is possible to make an electrolyte composition that shows low methanol crossover, and high proton conductivity, when used as a solid electrolyte for a solid polymer fuel cell or the like. By using an electrolyte composition according to this method, it is possible to make a solid electrolyte membrane and a solid polymer fuel cell that show excellent resistance to acids, low methanol crossover, and high proton conductivity.

According to the present invention, it is possible to obtain an electrolyte composition that shows low methanol crossover, and high proton conductivity, when used as a solid electrolyte for a solid polymer fuel cell or the like. Good adhesion to a perfluorinated resin (Nafion) in the capacity of a binder of an electrode layer of a fuel cell and excellent resistance to acids can also be realized. By using this electrolyte composition, it is also possible to realize a solid electrolyte membrane and a solid polymer fuel cell that show excellent resistance to acids, low methanol crossover, and high proton conductivity.

BRIEF DESCRIPTION OF THE DRAWINGS

FIG. 1 shows examples of structures represented by formula (2);

FIG. 3 shows examples of structures represented by formula (4);

DESCRIPTION OF THE PREFERRED EMBODIMENTS

Embodiments of the present invention are explained below using figures, formulae, examples and the like. These figures, formulae, examples and explanations exemplify the present invention but do not limit the scope of the present invention. Other embodiments can of course be covered by the scope of the present invention as long as they are in accord with the intent of the present invention.

The electrolyte composition according to the present invention comprises a perfluorocyclobutane-containing polymer having a structural (repeating) unit represented by formula (1).

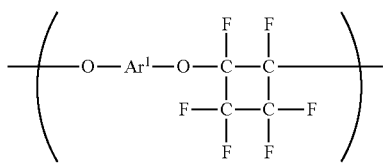
(1)

In formula (1), $Ar^1$ is a structural unit represented by formula (2), (3) or (4).

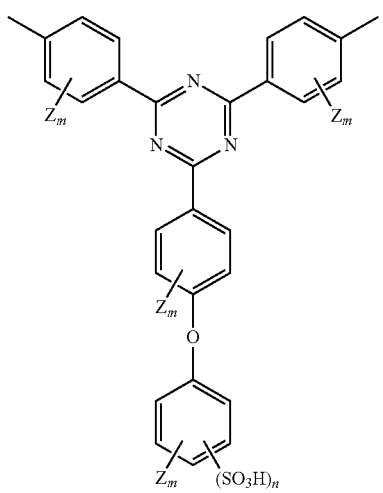
(2)

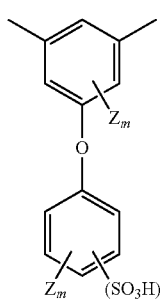
(3)

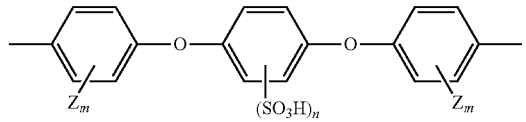
(4)

Figure 2:
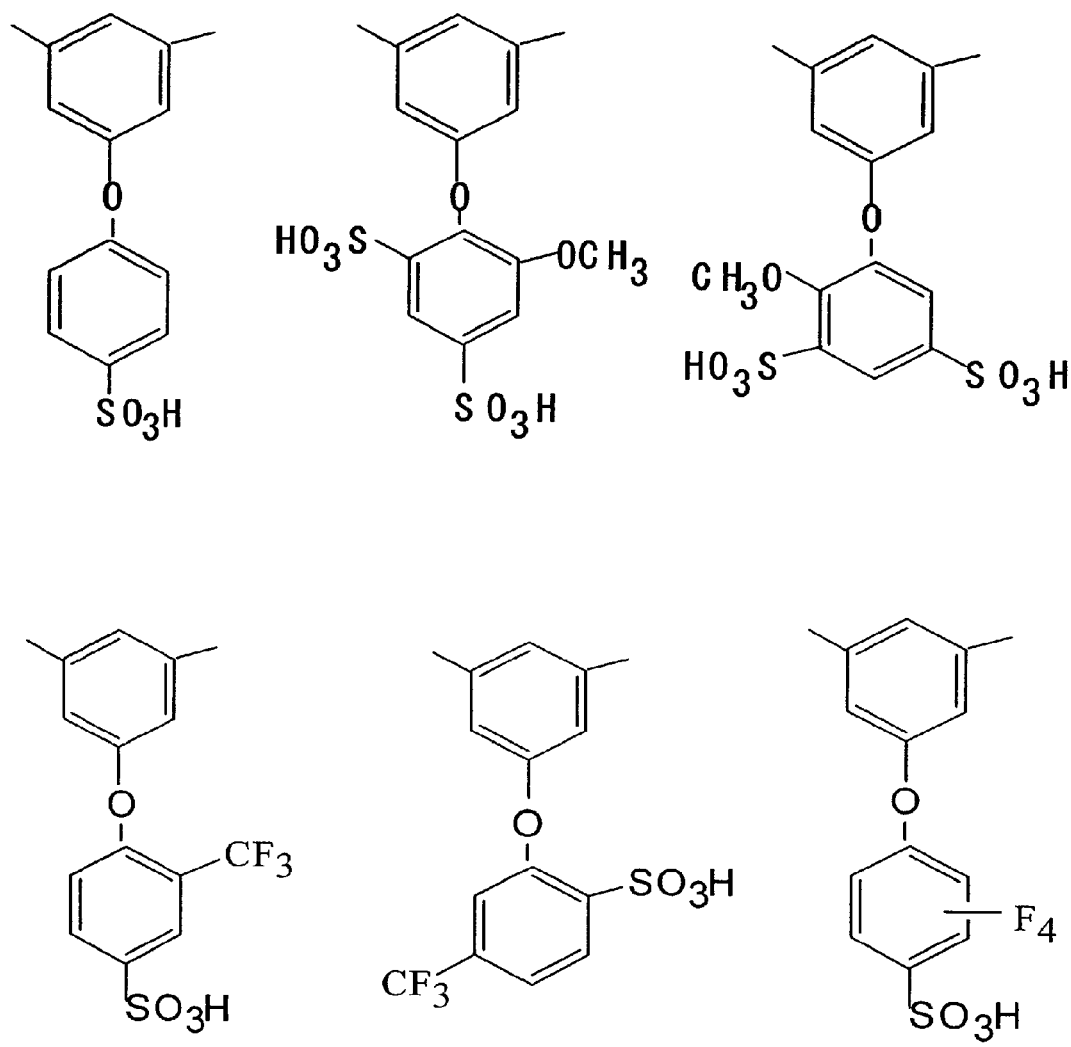
FIG. 2 shows examples of structures represented by formula (3)

In formulae (2), (3), and (4), Z's are, independent from each other, F or $CF_3$; m's are, independent from each other, an integer of not less than 0 on each benzene ring; and n's are, independent from each other, an integer of not less than 1. When m is zero, hydrogen is present at the position of Z. Examples of structures represented by formula (2) are shown in FIG. 1, examples of structures represented by formula (3) are shown in FIG. 2, and examples of structures represented by formula (4) are shown in FIG. 3. It is to be noted that the benzene rings in formulae (2), (3) and (4) may have other substituents.

By having such a structure, it is possible to obtain an electrolyte composition that shows a good adhesion to perfluorinated resins (Nafion) in the capacity of a binder of an electrode layer of a fuel cell, excellent resistance to acids and oxidative conditions, low methanol crossover, and high proton conductivity, when used as a solid electrolyte for a solid polymer fuel cell or the like.

The ion channel structure that gives high proton conductivity is provided by a sulfonic acid group or groups connected to benzene rings of $Ar^1$. It is preferable for $Ar^1$ to have one or two sulfonic acid groups. Sulfonic acid groups may be introduced at the monomer stage, at which it is easy to control the degree of sulfonation. Reduction of methanol crossover is realized by the introduction of rigid-structures with aromatic rings, or a combination of rigid-structures with aromatic rings and three dimensionally cross-linked structure. Also, by introducing fluorine into these aromatic rings, it is possible to reduce the number of H bonds, thus reducing or preventing the degradation of the composition in water/methanol or in strong acidic and oxidative conditions. It also helps realize good adhesion to perfluorinated resins such as Nafion.

The structural unit represented by formula (1) may be obtained by chemical reaction of a compound represented by formula (5) (in formula (5), $Ar^1$ is the same as $Ar^1$ of formula (1)).

$$F_2C=FC-0-Ar^1-0-CF=CF_2 \quad (5)$$

Any known method may be applied to the synthesis of a compound represented by formula (5). It is possible to utilize the Grignard reaction as shown in the examples.

It is more preferable for the above-described perfluorocyclobutane-containing polymer to have a cross-linked structure from the viewpoint of reduction of methanol crossover, etc.

For this purpose, it is preferable for the perfluorocyclobutane-containing polymer according to the present invention further to have a structural unit represented by formula (6) besides a structural unit represented by formula (1).

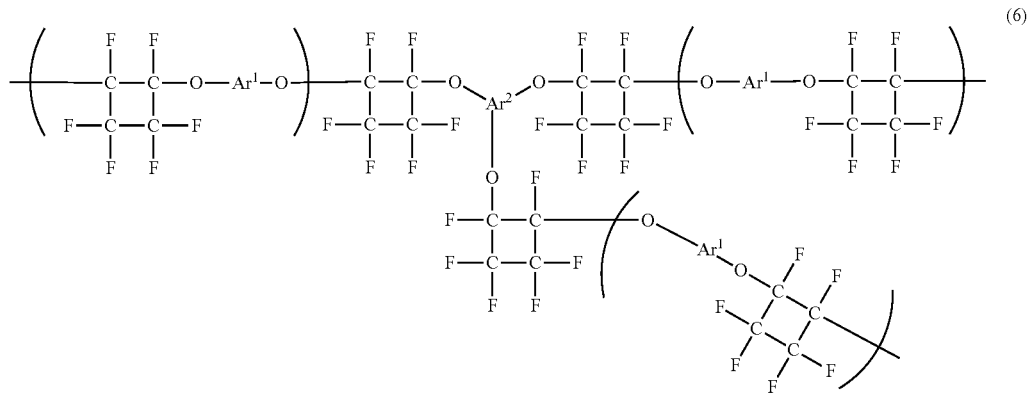

(6)

(in formula (6), Ar$^1$'s are, independently from each other and independently from Ar$^1$ of formula (1), a structural unit represented by formula (2), (3) or (4); and Ar$^2$ is a structural unit represented by formula (7), (8) or (9)).

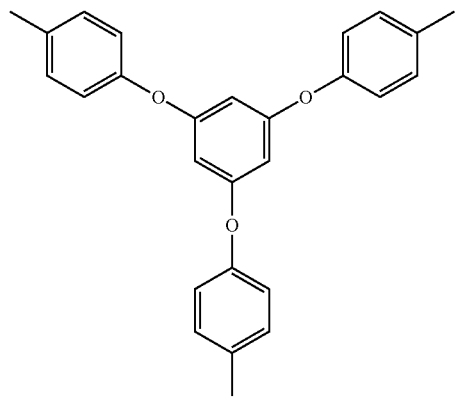

(7)

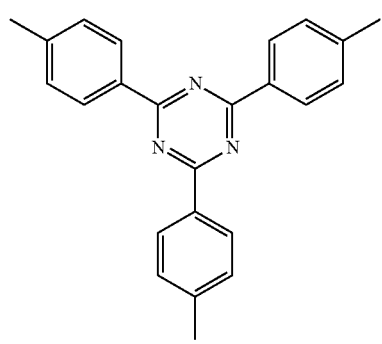

(8)

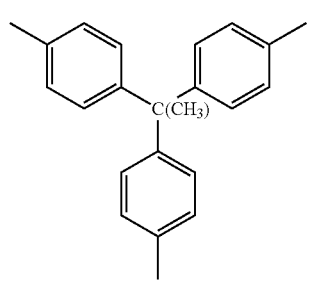

(9)

The structure represented by formula (6) is a three-armed structure, and accordingly, produces a three-dimensionally cross-linked polymer structure when the polymerization occurs. It is to be noted that the structural unit represented by formula (1) and the structural unit represented by formula (6) are not necessarily included in the same polymer.

It is possible to make the structural unit represented by the formula (6) by chemical reaction of a compound represented by formula (10) with a compound represented by formula (5) (in formula (10), Ar$^2$ is the same as Ar$^2$ of formula (6); and in formula (5), Ar$^1$ is the same as Ar$^1$ of formula (1)).

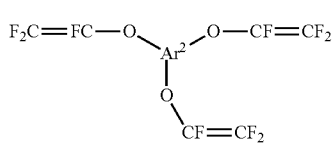

(10)

Any known method may be applied for the synthesis of a compound represented by formula (10). It is possible to utilize the Grignard reaction as shown in the examples.

It is to be noted that the perfluorocyclobutane-containing polymer according to the present invention may be a homopolymer, a random copolymer, a block copolymer, or a mixture thereof. A homopolymer means a polymer substantially consisting of a structural unit represented by formula (1). A random copolymer means a copolymer comprising a structural unit represented by formula (1) in a substantially random way, a copolymer consisting of a structural unit represented by formula (1) and a structural unit represented by formula (6) in which these structural units are disposed in a random way, or a copolymer comprising a structural unit represented by formula (1) and a structural unit represented by formula (6) in a random way. A block copolymer means a polymer substantially consisting of blocks of a structural unit represented by formula (1) and blocks of a structural unit represented by formula (6). Those random copolymers comprising a plurality of different structural units of formulae (1) and (6), and those block copolymers comprising a plurality of different blocks of structural units of formulae (1) and (6) are also included in the category of the present invention.

Any reaction may be applied, including dimerization, oligomerization, and polymerization. Thus, the perfluorocyclobutane-containing polymer according to the present invention can be obtained by polymerization when it is a homopolymer, and it can be obtained by subjecting, for example, an oligomer obtained by oligomerization or a polymer to a redistribution reaction or polymerization reaction together with other oligomers or polymers when it is a block copolymer.

It is preferable that the perfluorocyclobutane-containing polymer according to the present invention has a number average molecular weight Mn in the range of from 5,000 to 10,000,000, in terms of the film forming performance. When the perfluorocyclobutane-containing polymer according to the present invention is a mixture of polymers, Mn is determined by handling the mixture as a single polymer.

By the present invention, a novel electrolyte composition is provided. From this electrolyte composition, it is possible to provide a solid electrolyte membrane that is chemically stable in strong acidic and oxidative conditions and accordingly, can be used for DMFCs, reforming-type methanol fuel cells, hydrogen fuel cells, etc. When used for DMFCs, the solid electrolyte membrane shows low methanol crossover and high proton conductivity.

It is to be noted that other polymers, solvents, catalysts and additives may be contained in the electrolyte composition according to the present invention, besides the above-described perfluorocyclobutane-containing polymer and compounds. Polyacrylate and polysiloxane are examples of the other polymers. Dimethyl acetamide, dimethyl formamide, N-methyl pyrrolidone, dimethyl sulfoxide, and meta-cresol are examples of the solvent.

Solid electrolyte membranes can be formed from an electrolyte composition according to the present invention that is obtained in this way. When the electrolyte composition according to the present invention contains an organic solvent, solid electrolyte membranes can be easily prepared by applying this electrolyte composition onto a substrate, and then removing the solvent. A heat treatment may also be carried out after the removal of the solvent. Any material may be used for the substrate if it is inert to the electrolyte composition and solvent, and can form a film of the electrolyte composition. Furthermore, a hot-press rolling process after the removal of the solvent is useful in many cases. The hot-press rolling provides an effect of improving the adhesion between the catalyst layers and electrolyte membrane. The hot-press rolling processing is preferably carried out under conditions of a temperature in the range of from 100 to 160° C., and a pressure of from 10 to 150 kg/cm$^2$.

A solid electrolyte membrane obtained in this way can be used for solid polymer fuel cells, particularly DMFCs, a reforming-type methanol fuel cells, and hydrogen fuel cells. The solid electrolyte membrane is chemically stable in strong acidic and oxidative conditions. When used for DMFCs, the solid electrolyte membrane shows low methanol crossover and high proton conductivity.

EXAMPLES

Examples according to the present invention are explained below. Evaluation was performed by the following methods.
(Methanol Permittivity)
The methanol permittivity values were determined by keeping a 10 wt. % aqueous methanol solution and de-ionized water separated from each other by the electrolyte membrane (48 μm thick) in a stainless steel vessel at 30° C. and then measuring the amount of methanol that seeped into the de-ionized water by gas chromatography/mass spectroscopy (GC/MS) at regular time intervals.
(Proton Conductivity)
The test sample was placed between platinum electrodes that were 1 cm apart. Proton conductivity was calculated from the measurement of the film resistance performed according to the alternating current impedance method (frequency from 100 Hz to 100 kHz) using a 4-point probe at room temperature and a voltage of 0.3 V.

Example 1

Synthesis of Monomers

Figure 4:
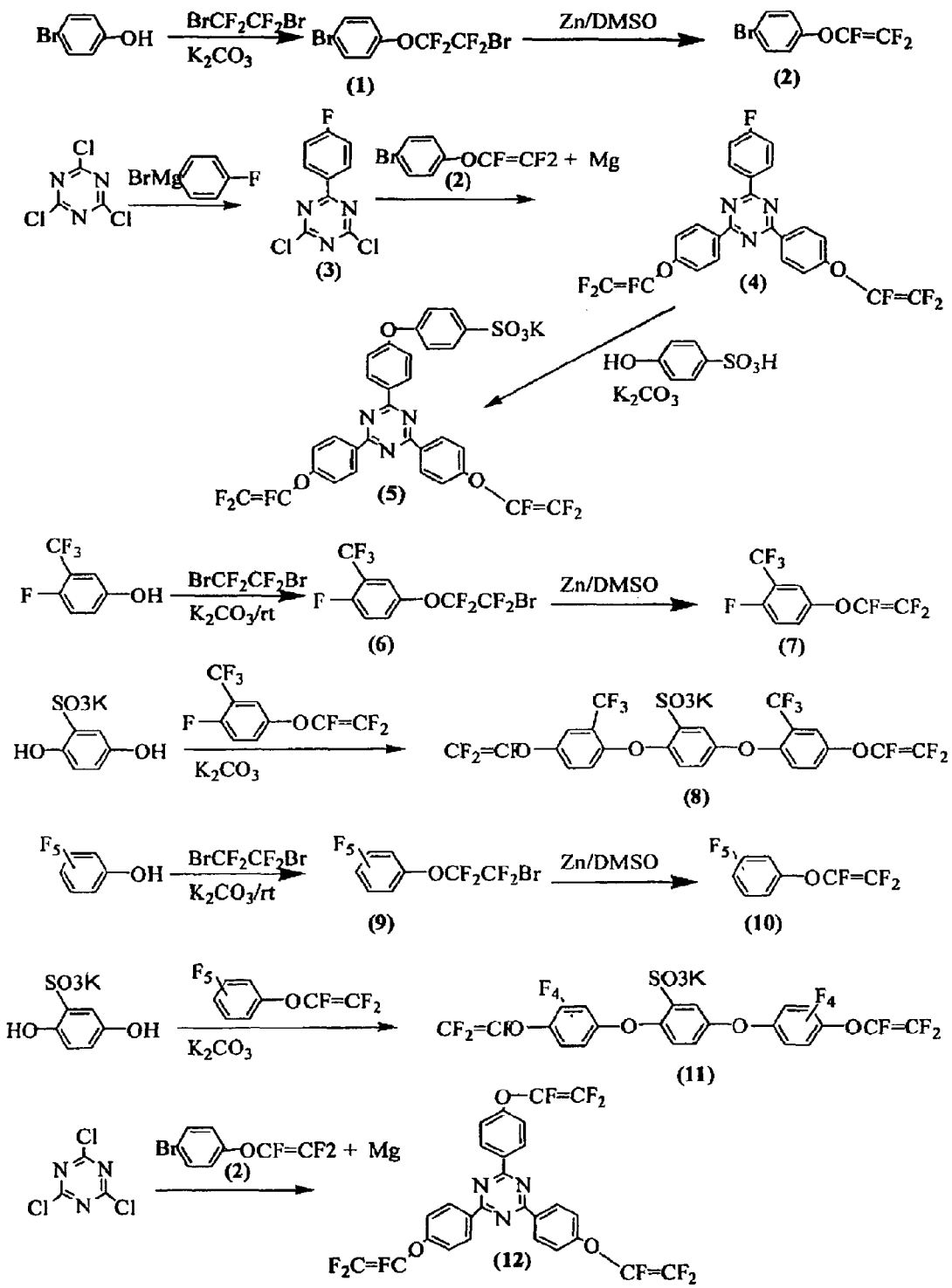
FIG. 4 shows preparation routes for some monomers according to the present invention.
Figure 5:
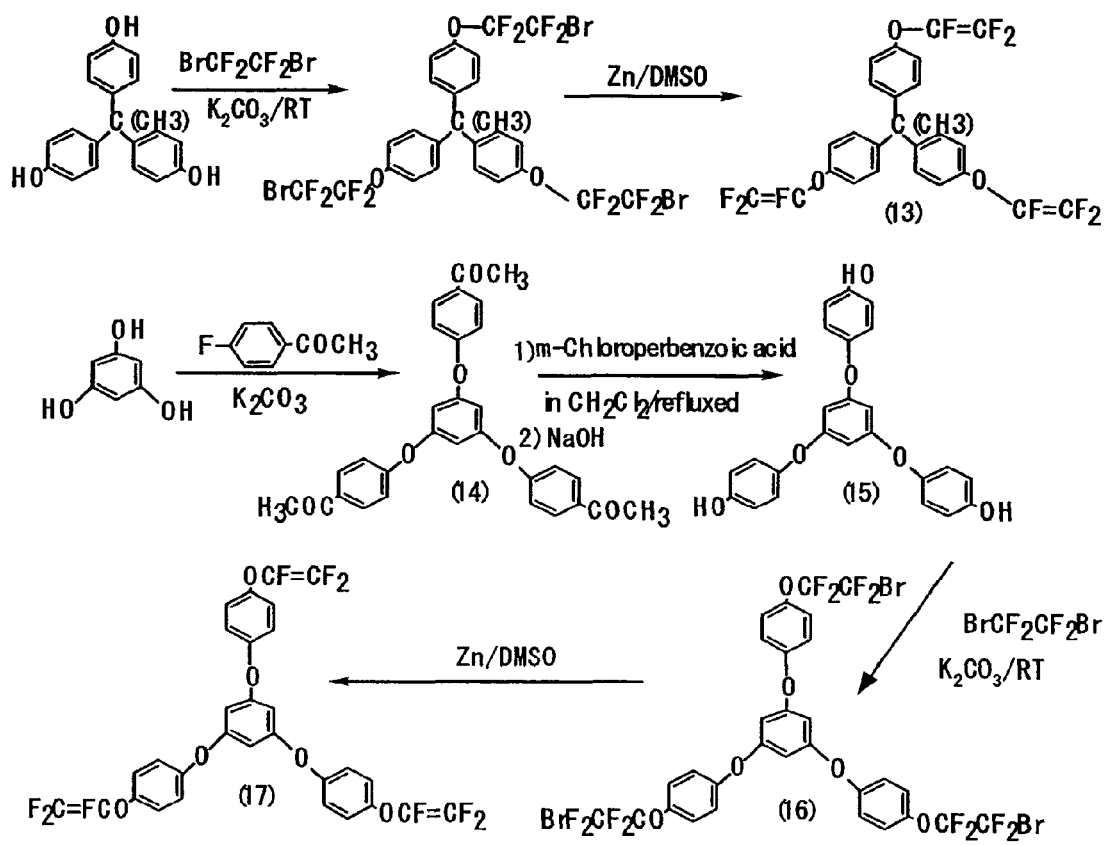
FIG. 5 shows preparation routes for some monomers according to the present invention.
Figure 6:
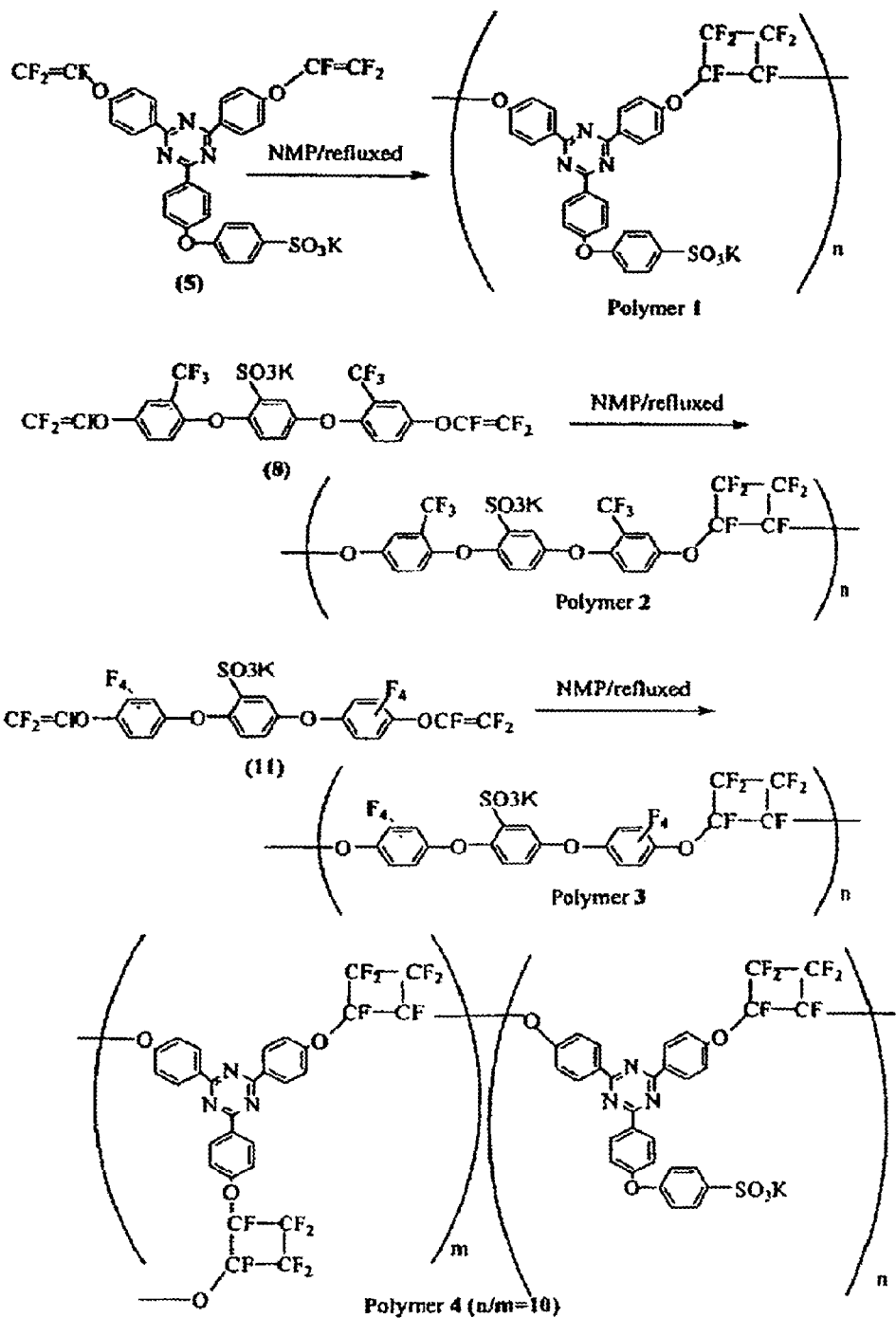
FIG. 6 shows polymerization routes for some polymers according to the present invention.
Figure 7:
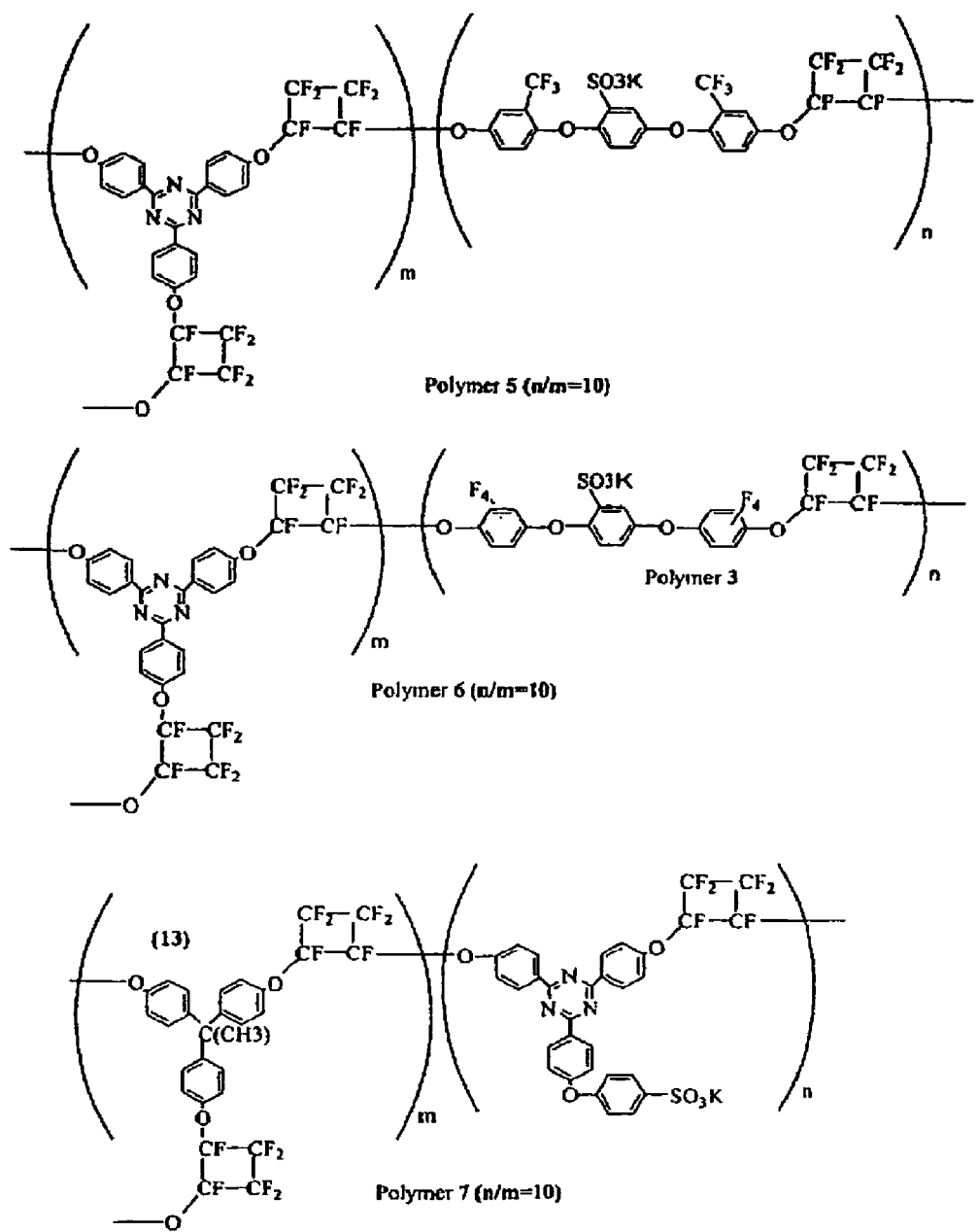
FIG. 7 shows some polymers according to the present invention.
Figure 8:
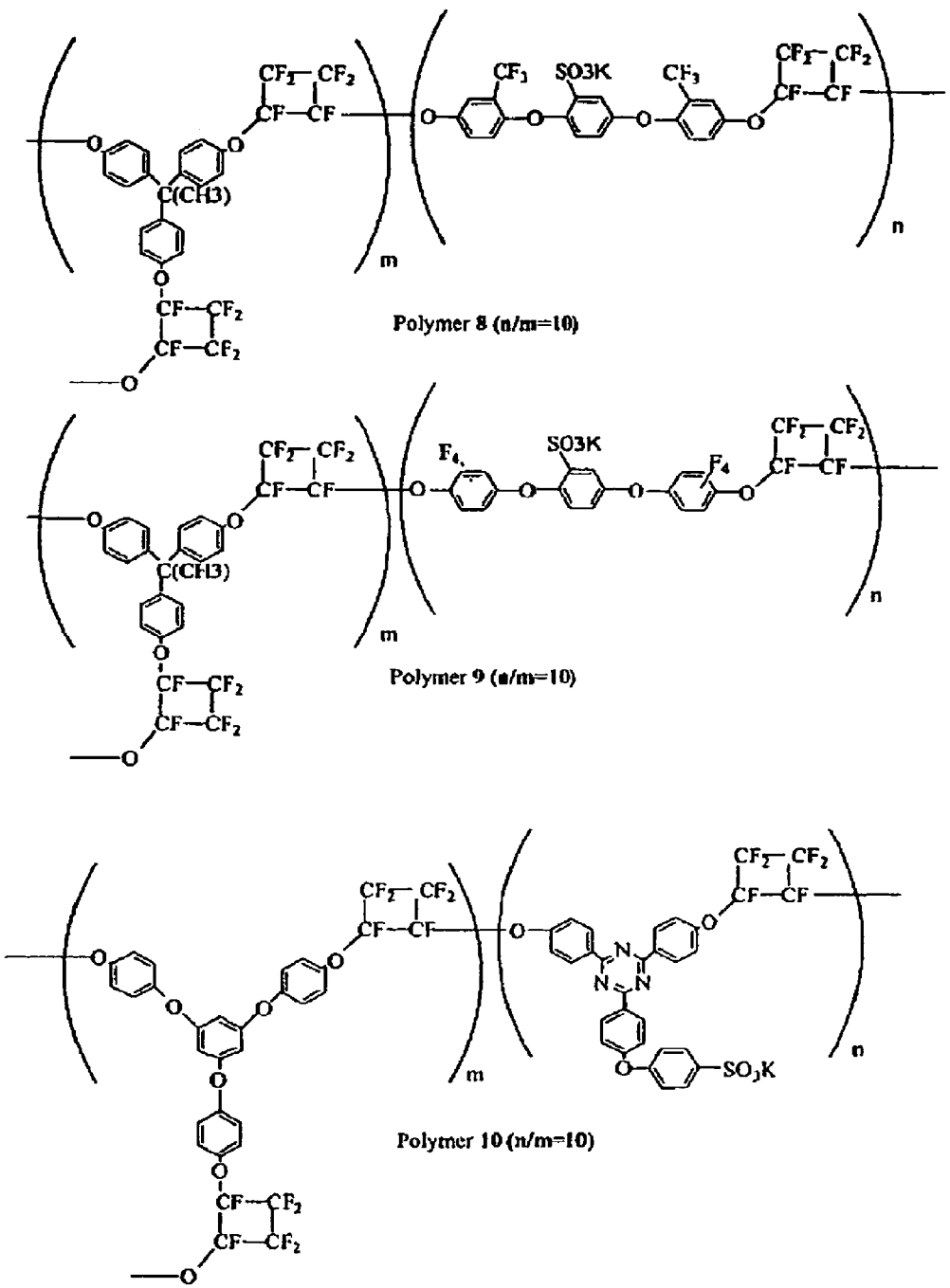
FIG. 8 shows some polymers according to the present invention.
Figure 9:
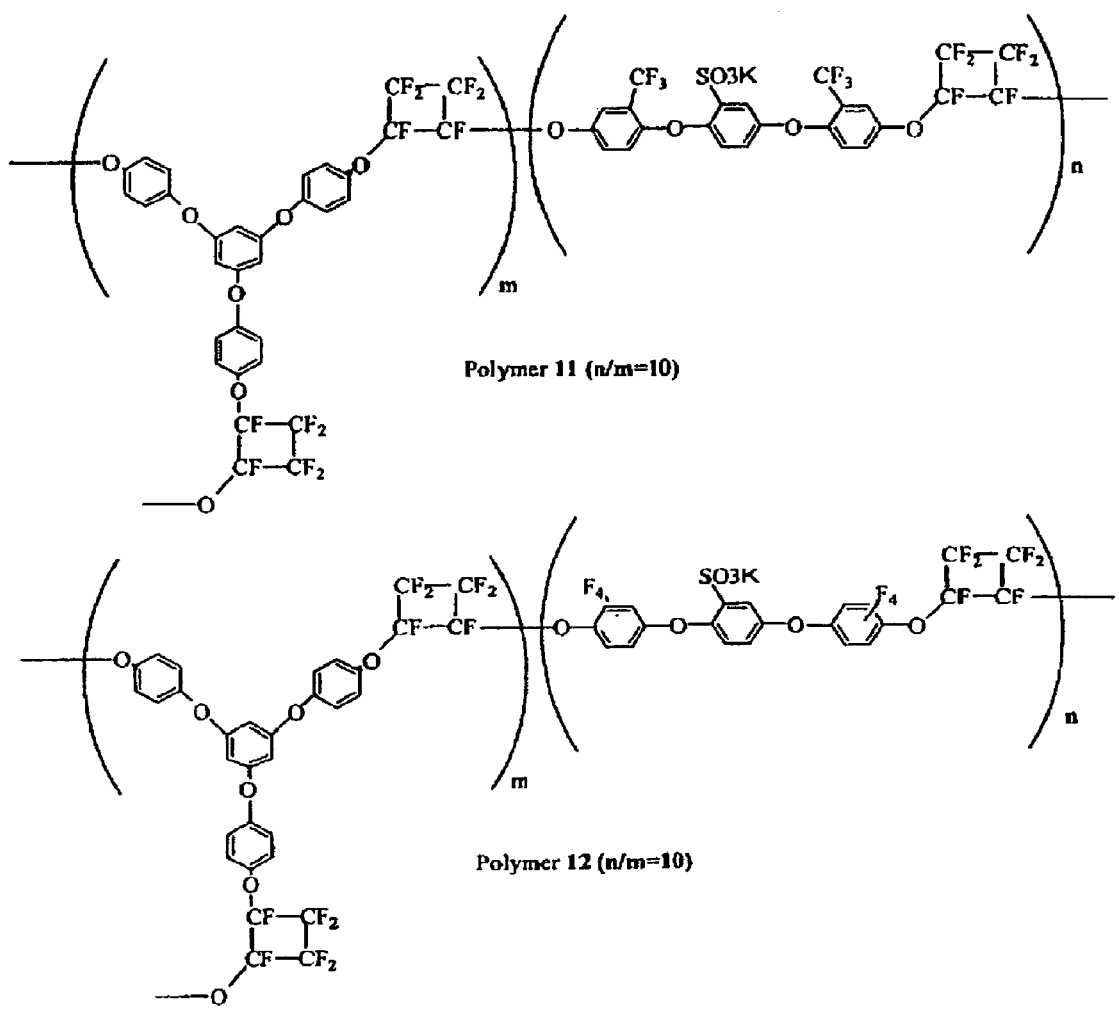
FIG. 9 shows some polymers according to the present invention.

Monomers 1-17 were synthesized according to the following procedures. The reaction schemes are shown in FIGS. 4 and 5.
(Monomer 1 and Monomer 2)
They were synthesized according to the literature procedures (Macromolecules, 1996, vol. 29(3), p. 852). The structure identification was carried out by $^1$H-NMR, $^{19}$F-NMR and mass spectroscopy (MS).

2,4-dichloro-6-(4-fluorophenyl)-1,3,5-triazine-monomer 3

A THF (tetrahydrofuran) solution (200 mL) of 4-bromofluorobenzene (17.5 g, 0.1 mol) and Mg (2.64 g, 0.11 mol) was stirred for two hours at 30° C., and then refluxed for two hours. This solution was added to a THF solution (200 mL) of cyanuric chloride (21.58 g, 0.120 mol) at −20° C. The mixture was stirred for five hours at −20° C. The solvent was then removed under a reduced pressure.

The resulting solid was dissolved into dichloromethane, and washed with water twice. The organic phase was dried over anhydrous MgSO$_4$, and the solvent was removed by evaporation. The crude product was recrystallized with methylene chloride/n-hexane mixture.

The yield was 85%. $^1$H-NMR result (CDCl$_3$, δ ppm) was 8.25 (m, 2H, ArH-triazine), and 7.40 (m, 2H, ArH-triazine).

2,4-bis(4-trifluorovinyloxyphenyl)-6-(4-fluorophenyl)-1,3,5-triazine-monomer 4

A THF solution (75 mL) of monomer 3 (12.2 g, 0.05 mol) was added to a THF solution (150 mL) of 4-trifluorovinyloxyphenyl magnesium bromide prepared from monomer 2 (37.9 g, 0.15 mol) and Mg (4.8 g, 0.20 mol). The mixture was refluxed for 10 hours, and then the solvent was removed by evaporation under a reduced pressure.

The remaining solid was dissolved into dichloromethane. The mixture was washed with water twice. The organic layer was dried over anhydrous MgSO$_4$, and the solvent was removed by evaporation. The crude product was purified over silica gel by column chromatography, using hexane and dichloromethane (1:1) as the solvent. The yield was 60%. $^1$H-NMR result (CDCl$_3$, δ ppm) was 8.68 (d, 4H, ArH-triazine), 8.28 (m, 2H, ArH-triazine), 7.20 (d, 4H, ArH-triazine), and 7.45 (m, 2H, ArH-triazine).

potassium 2,4-bis[4-(trifluorovinyloxy)phenyl]-6-[4-[4-(sulfonatephenoxy)]phenyl]-1,3,5-triazine-monomer 5

Monomer 4 (46.7 g, 0.09 mol) was added to a dry DMSO (dimethylsulfoxide) solution (200 mL) of potassium 4-hydroxybenzenesulfonate (21.2 g, 0.1 mol) and anhydrous K$_2$CO$_3$ (7.6 g, 0.055 mol). The mixture was stirred at 80° C. for 6 hours. The reaction mixture was filtered, and the solvent in the filtrate was removed by distillation under a reduced pressure.

The crude product was purified over silica gel by column chromatography, using THF as the eluent. The yield was 66%. $^1$H-NMR result (CDCl$_3$, δ ppm) was 8.80-8.40 (m, 6H, ArH-triazine), 7.60 (d, 2H, ArH), 7.30-7.10 (m, 6H, ArH-triazine), and 6.93 (d, 2H, ArH).

3-(2-bromo)tetrafluoroethoxy-6-fluorobenzotrifluoride-monomer 6

Monomer 6 was synthesized from 3-hydroxy-6-fluorobenzotrifluoride and 1,2-dibromotetrafluoroethane, according to the same procedure as that for monomer 1. $^1$H-NMR result (CDCl$_3$, δ ppm) was 7.42 (s, 1H, ArH), and 7.15-7.35 (m, 2H, ArH).

3-(trifluorovinyloxy)-6-fluorobenzotrifluoride-monomer 7

Monomer 7 was synthesized from monomer 6 in the same procedure as that for monomer 2. $^1$H-NMR result (CDCl$_3$, δ ppm) was 7.60 (s, 1H, ArH), and 7.27-7.38 (m, 2H, ArH).

potassium 2,5-bis[(2-trifluoromethyl-4-trifluoroviny-
loxy)phenoxy]benzenesulfonate-monomer 8

Monomer 7 (52.0 g, 0.2 mol) was added to a dry DMSO solution (200 mL) of potassium hydroquinonesulfonate (19.6 g, 0.1 mol) and anhydrous K2CO3 (15.2 g, 0.11 mol). The mixture was stirred at 80° C. for 6 hours. The reaction mixture was filtered, and the solvent of the filtrate was removed by distillation under a reduced pressure.

The crude product was purified over silica gel by column chromatography, using THF as the eluent. The yield was 71%. $^1$H-NMR result (CDCl$_3$, δ ppm) was 7.60 (d, 1H, ArH), 7.50-7.10 (m, 5H, ArH), 6.80 (d, 1H, ArH), and 7.01 (dd, 2H, ArH).

(Monomer 9, 10 and 11)

Monomers 9, 10 and 11 were synthesized, using pentafluorophenol as the starting material, according to the same procedures as those for monomers 6, 7, and 8.

2,4,6-tris(4-trifluorovinyloxyphenyl)-1,3,5-triazine-
monomer 12, and 1,1,1-tris(4-trifluorovinyloxyphe-
nyl)ethane-monomer 13

Monomers 12 and 13 were synthesized according to Macromolecules, 2003, vol. 36, p. 8001. The structural analysis was carried out by $^1$H-NMR, $^{19}$F-NMR and MS.

1,3,5-tris(4-acetylphenoxy)benzene-monomer 14

4-fluoroacetophenone (51.4 g, 0.3 mol) was added to a dry DMSO solution (200 mL) of pluoroglucinol (12.6 g, 0.1 mol) and anhydrous K$_2$CO$_3$ (27.6 g, 0.20 mol). The mixture was stirred at 80° C. for 6 hours. The reaction mixture was filtered, and the solvent of the filtrate was removed by distillation under a reduced pressure.

The crude product was purified over silica gel by column chromatography, using hexane and ethyl acetate (10:1) as the eluent. The yield was 80%. $^1$H-NMR result (CDCl$_3$, δ ppm) was 7.89 (d, 6H, ArH), 6.94 (d, 6H, ArH), 6.15 (s, 3H, ArH), and 2.56 (s, 9H, COCH$_3$).

1,3,5-tris(4-hydroxyphenoxy)benzene-monomer 15

Monomers 14 (48.0 g, 0.1 mol) and MCPBA (methachloroperbenzoic acid) (100.8 g, 0.6 mol) were dissolved in dry CH$_2$Cl$_2$ (200 mL), and the mixture was refluxed for 10 hours. The reaction mixture was filtered, and the solvent of the filtrate was removed by distillation. The crude product was dissolved into ethanol (200 mL), and NaOH (14.0 g, 0.35 mol) was added to the mixture. The mixture was refluxed for 2 hours and neutralized with 1 M HCl, the reaction mixture was filtered, and the solvent of the filtrate was removed by distillation under a reduced pressure. The crude product was recrystallized with ethanol. The yield was 73%. $^1$H-NMR result (CDCl$_3$, δ ppm) was 7.01 (d, 6H, ArH), 6.90 (d, 6H, ArH), and 6.17 (s, 3H, ArH).

1,3,5-tris(4-trifluorovinyloxyphenyl)benzene-mono-
mer 17

Monomer 17 was prepared from monomer 15 in the same procedure as that for monomer 13. The yield was 80%. $^1$H-NMR result (CDCl$_3$, δ ppm) was 6.920 (d, 6H, ArH), 6.80 (d, 6H, ArH), 6.28 (s, 3H, ArH), and 5.34 (bs, 3H, ArOH).

Example 2

Synthesis of Polymers

Polymers 1-12 were prepared according to the following procedures. The routes of the polymerizations are shown in FIGS. 6-9. In FIGS. 6-9, the polymers are shown in the form of potassium salts or sodium salts.

(Polymer 1)

Monomer 5 (6.4 g, 10 mmol) was dissolved into dry NMP (15 g) in a three-necked, round-bottom flask with a nitrogen purging system. The mixture was refluxed for 16 hours. The reaction mixture was poured into water (50 mL) to separate the polymer, which was dried in vacuo at 80° C. for two days.

The inherent viscosity of the polymer was 0.38 dL/g. In all the examples, the inherent viscosity was measured at 30° C., for 0.25 g/dL DMSO solutions of polymers, using an Ostwald capillary viscometer.

A 20% by weight DMSO solution of the obtained polymer was prepared, and was applied onto a glass plate, using a doctor blade having a gap size of 300 µm. The solvent was removed at 50° C. for one hour, 120° C. for one hour and 200° C. for one hour, to form a membrane with a film thickness of about 48 µm. The membrane was immersed in a 1 mol/L sulfuric acid solution for 24 hours, and then washed with deionized water until no acid was detected.

The methanol permittivity of the sample film obtained was 2.61×10$^{-8}$ mL/s.cm. To compare, the methanol permittivity of Nafion 112 was 1.08×10$^{-7}$ mL/s.cm. The proton conductivity of the sample membrane was 0.098 S/cm. To compare, the proton conductivity of Nafion 112 was 0.112 S/cm.

(Polymer 2)

Monomer 8 (7.1 g, 10 mmol) was dissolved into dry NMP (15 g) in a three-necked, round-bottom flask with a nitrogen purging system. The mixture was refluxed for 16 hours. The reaction mixture was poured into water (50 mL) to separate the polymer, which was dried in vacuo at 80° C. for two days.

The inherent viscosity of the polymer was 0.31 dL/g. The same film forming procedure as for polymer 1 was carried out to form a sample membrane with a film thickness of 51 µm. The methanol permittivity of the membrane was 4.1×10$^{-8}$ mL/s.cm, and the proton conductivity was 0.120 S/cm.

(Polymer 3)

Monomer 11 (7.0 g, 10 mmol) was dissolved into dry NMP (15 g) in a three-necked, round-bottom flask with a nitrogen purging system. The mixture was refluxed for 16 hours. The reaction mixture was poured into water (50 mL) to separate the polymer, which was dried in vacuo at 80° C. for two days.

The inherent viscosity of the polymer was 0.28 dL/g. The same film forming procedure as for polymer 1 was carried out to form a sample membrane with a film thickness of 43 µm. The methanol permittivity of the membrane was 6.1×10$^{-8}$ mL/s.cm, and the proton conductivity was 0.110 S/cm.

(Polymer 4)

Monomer 5 (6.4 g, 10 mmol) and monomer 12 (0.60 g, 1 mmol) were dissolved into dry NMP (15 g) in a three-necked, round-bottom flask with a nitrogen purging system. The mixture was refluxed for 16 hours. The reaction mixture was poured into water (50 mL) to separate the polymer, which was dried in vacuo at 80° C. for two days.

The inherent viscosity of the polymer was 0.31 dL/g. The same film forming procedure as for polymer 1 was carried out to form a sample membrane with a film thickness of 57 µm. The methanol permittivity of the membrane was 1.64×10$^{-8}$ mL/s.cm, and the proton conductivity was 0.0890 S/cm.

(Polymer 5)

Monomer 8 (7.1 g, 10 mmol) and monomer 12 (0.60 g, 1 mmol) were dissolved into dry NMP (15 g) in a three-necked, round-bottom flask with a nitrogen purging system. The mixture was refluxed for 16 hours. The reaction mixture was poured into water (50 mL) to separate the polymer, which was dried in vacuo at 80° C. for two days.

The inherent viscosity of the polymer was 0.29 dL/g. The same film forming procedure as for polymer 1 was carried out to form a sample membrane with a film thickness of 53 µm. The methanol permittivity of the membrane was 1.84×10$^{-8}$ mL/s.cm, and the proton conductivity was 0.094 S/cm.

(Polymer 6)

Monomer 11 (7.0 g, 10 mmol) and monomer 12 (0.60 g, 1 mmol) were dissolved into dry NMP (15 g) in a three-necked, round-bottom flask with a nitrogen purging system. The mixture was refluxed for 16 hours. The reaction mixture was poured into water (50 mL) to separate the polymer, which was dried in vacuo at 80° C. for two days.

The inherent viscosity of the polymer was 0.27 dL/g. The same film forming procedure as for polymer 1 was carried out to form a sample membrane with a film thickness of 54 µm. The methanol permittivity of the membrane was $1.95 \times 10^{-8}$ mL/s.cm, and the proton conductivity was 0.088 S/cm.

(Polymer 7)

Monomer 5 (6.4 g, 10 mmol) and monomer 13 (0.50 g, 1 mmol) were dissolved into dry NMP (15 g) in a three-necked, round-bottom flask with a nitrogen purging system. The mixture was refluxed for 16 hours. The reaction mixture was poured into water (50 mL) to separate the polymer, which was dried in vacuo at 80° C. for two days.

The inherent viscosity of the polymer was 0.21 dL/g. The same film forming procedure as for polymer 1 was carried out to form a sample membrane with a film thickness of 41 µm. The methanol permittivity of the membrane was $2.14 \times 10^{-8}$ mL/s.cm, and the proton conductivity was 0.091 S/cm.

(Polymer 8)

Monomer 8 (7.1 g, 10 mmol) and monomer 13 (0.50 g, 1 mmol) were dissolved into dry NMP (15 g) in a three-necked, round-bottom flask with a nitrogen purging system. The mixture was refluxed for 16 hours. The reaction mixture was poured into water (50 mL) to separate the polymer, which was dried in vacuo at 80° C. for two days.

The inherent viscosity of the polymer was 0.27 dL/g. The same film forming procedure as for polymer 1 was carried out to form a sample membrane with a film thickness of 43 µm. The methanol permittivity of the membrane was $2.00 \times 10^{-8}$ mL/s.cm, and the proton conductivity was 0.094 S/cm.

(Polymer 9)

Monomer 11 (7.0 g, 10 mmol) and monomer 13 (0.50 g, 1 mmol) were dissolved into dry NMP (15 g) in a three-necked, round-bottom flask with a nitrogen purging system. The mixture was refluxed for 16 hours. The reaction mixture was poured into water (50 mL) to separate the polymer, which was dried in vacuo at 80° C. for two days.

The inherent viscosity of the polymer was 0.29 dL/g. The same film forming procedure as for polymer 1 was carried out to form a sample membrane with a film thickness of 48 µm. The methanol permittivity of the membrane was $2.34 \times 10^{-8}$ mL/s.cm, and the proton conductivity was 0.0790 S/cm.

(polymer 10)

Monomer 5 (6.4 g, 10 mmol) and monomer 17 (0.59 g, 1 mmol) were dissolved into dry NMP (15 g) in a three-necked, round-bottom flask with a nitrogen purging system. The mixture was refluxed for 16 hours. The reaction mixture was poured into water (50 mL) to separate the polymer, which was dried in vacuo at 80° C. for two days.

The inherent viscosity of the polymer was 0.24 dL/g. The same film forming procedure as for polymer 1 was carried out to form a sample membrane with a film thickness of 45 µm. The methanol permittivity of the membrane was $1.81 \times 10^{-8}$ mL/s.cm, and the proton conductivity was 0.074 S/cm.

(Polymer 11)

Monomer 8 (7.1 g, 10 mmol) and monomer 17 (0.59 g, 1 mmol) were dissolved into dry NMP (15 g) in a three-necked, round-bottom flask with a nitrogen purging system. The mixture was refluxed for 16 hours. The reaction mixture was poured into water (50 mL) to separate the polymer, which was dried in vacuo at 80° C. for two days.

The inherent viscosity of the polymer was 0.26 dL/g. The same film forming procedure as for polymer 1 was carried out to form a sample membrane with a film thickness of 46 µm. The methanol permittivity of the membrane was $2.04 \times 10^{-8}$ mL/s.cm, and the proton conductivity was 0.082 S/cm.

(Polymer 12)

Monomer 11 (7.0 g, 10 mmol) and monomer 17 (0.59 g, 1 mmol) were dissolved into dry NMP (15 g) in a three-necked, round-bottom flask with a nitrogen purging system. The mixture was refluxed for 16 hours. The reaction mixture was poured into water (50 mL) to separate the polymer, which was dried in vacuo at 80° C. for two days.

The inherent viscosity of the polymer was 0.22 dL/g. The same film forming procedure as for polymer 1 was carried out to form a sample membrane with a film thickness of 38 µm. The methanol permittivity of the membrane was $1.75 \times 10^{-8}$ mL/s.cm, and the proton conductivity was 0.082 S/cm.

Example 3

Preparation of Direct Methanol Fuel Cells

Figure 10:
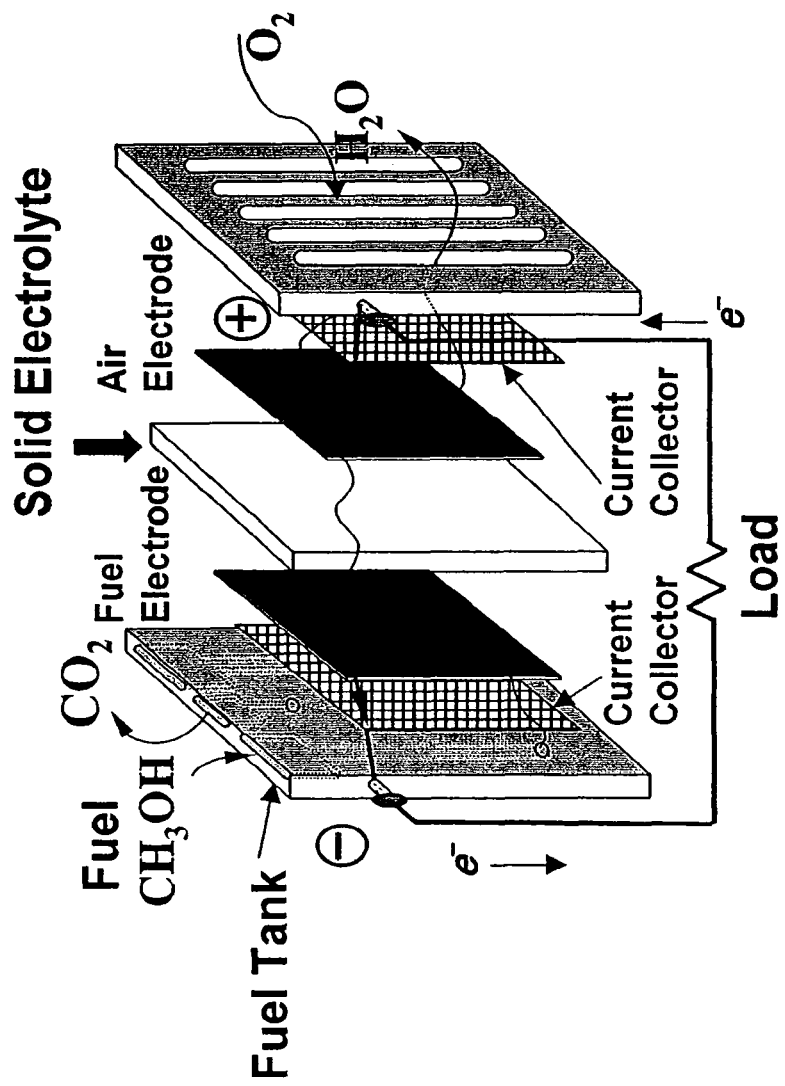
FIG. 10 is a schematic view of the structure of a direct methanol fuel cell.

Direct methanol fuel cells having a structure as shown in FIG. 10 were prepared. First, the cathode catalyst layer was formed as follows. Two grams of carbon-supported Pt catalyst particles, in which Pt catalyst having particle size in the range of from 2 nm to 5 nm has been supported on Ketjen black (Ketjen Black EC, a product of Lion Ltd.) at about 50 wt. %, and 22 mL of 4.4 wt. % Nafion in water-2-propanol (Du Pont de Nemours & Co.), were mixed in a ball mill, followed by deaeration to form a paste. The paste was applied onto a Teflon® sheet, and dried at 80° C. for 30 minutes. A cathode catalyst layer was thus formed.

In the same way, 2 g of Pt/Ru catalyst particles in which a Pt—Ru alloy (molar ratio being 1:1) catalyst having a particle size in the range of from 2 nm to 5 nm was supported on Ketjen black (Ketjen Black EC, a product of Lion Corp.) at about 50 wt. %, and 22 mL of 4.4 wt. % Nafion in water-2-propanol (Du Pont de Nemours & Co.) were mixed in a ball mill, followed by deaeration to form a paste. The paste was applied onto a Teflon® sheet, and dried at 80° C. for 30 minutes. An anode catalyst layer was thus formed.

A newly developed electrolyte membrane (having a film thickness of 150 µm) was sandwiched in between the cathode and anode layers by hot pressing at 160° C. under a load of 25 kgf/cm$^2$ (converted value being 245 N/cm2) for about two minutes, to form an MEA (MEMBRANE ELECTRODE ASSEMBLY).

Next, two carbon papers (TGP-H-090, 290 µm thick, a product of Toray Ind. Inc.) were stuck onto either side of the MEA by hot pressing to form the electric power generating unit. After current collectors including the lead lines were connected to each electrode of the electric power generating unit, the electric power generating unit was packed with the fuel cell housings that consisted of the fuel tank on the anode side and ventilation slits on the cathode side. An aqueous methanol solution (20 to 30 vol. %) was injected into the test cells, and the power output was estimated by applying a fixed voltage between electrodes.

The performances of the fuel cells with the newly developed polymer electrolyte membranes were compared with that of Nafion 117, and the result is summarized in TABLE 1.

TABLE 1

Properties of fuel cells using the new electrolytes

| Electrolyte material | Average output voltage (V at 10 mA/cm$^2$) | Power capacity (when Nafion 117 was adjusted to be 100) |
|---|---|---|
| Polymer 1 | 0.45 | 184 |
| Polymer 2 | 0.50 | 190 |
| Polymer 3 | 0.48 | 187 |
| Nafion 117 | 0.38 | 100 |

What is claimed is:

1. A solid polymer fuel cell comprising a solid electrolyte membrane, wherein said solid electrolyte membrane is made from an electrolyte composition comprising an organic solvent and a perfluorocyclobutane-containing polymer comprising a structural unit represented by formula (1),

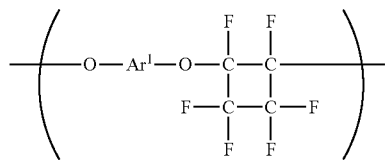

(in formula (1), Ar$^1$ is a structural unit represented by formula (2) or (3)),

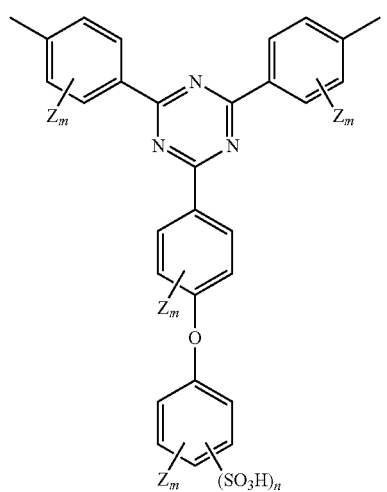

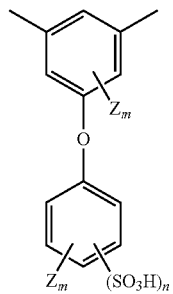

(in formulae (2) and (3), Z's are, independent from each other, F or CF$_3$; m's are, independent from each other, an integer of not less than 0 on each benzene ring; and n's are, independent from each other, an integer of not less than 1); and said solid electrolyte membrane is formed by a method comprising applying the electrolyte composition onto a substrate, and then, removing the solvent.

2. The solid polymer fuel cell according to claim 1, wherein hot-press rolling is carried out after the removal of said solvent.

3. The solid polymer fuel cell according to claim 1, wherein the structural unit represented by said formula (1) is obtained by chemical reaction of a compound represented by formula (5), $$F_2C=FC\text{-}0\text{-}Ar^1\text{-}0\text{-}CF=CF_2 \qquad (5)$$

(in formula (5), Ar$^1$ is the same as Ar$^1$ of formula (1)).

4. The solid polymer fuel cell according to claim 1, wherein said perfluorocyclobutane-containing polymer further comprises a structural unit represented by formula (6),

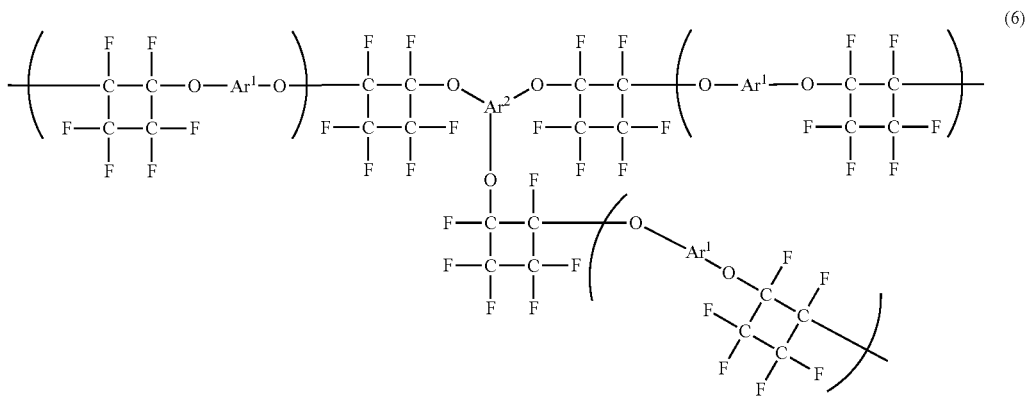

(in formula (6), $Ar^1$'s are, independently from each other and independently from $Ar^1$ of formula (1), a structural unit represented by formula (2) or (3); and $Ar^2$ is a structural unit represented by formula (7), (8) or (9))

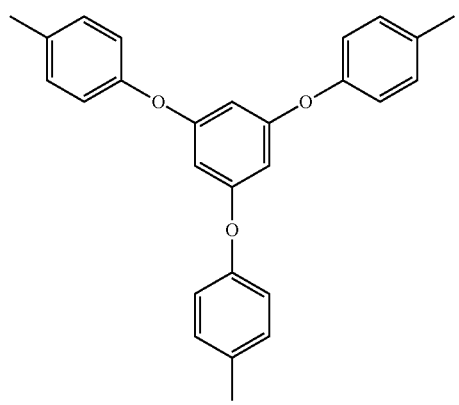
(7)

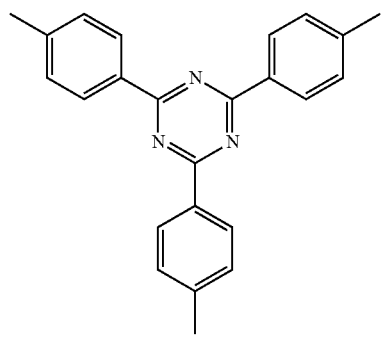
(8)

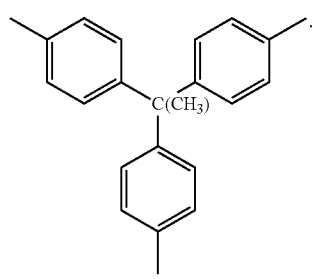
(9)

5. The solid polymer fuel cell according to claim 3, wherein said perfluorocyclobutane-containing polymer further comprises a structural unit represented by formula (6), (in formula (6), $Ar^1$'s are, independently from each other and independently from $Ar^1$ of formula (1), a structural unit represented by formula (2) or (3); and $Ar^2$ is a structural unit represented by formula (7), (8) or (9))

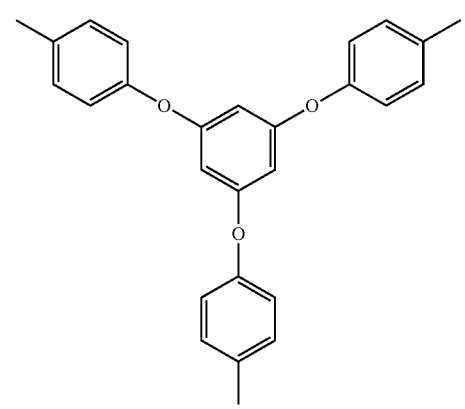
(7)

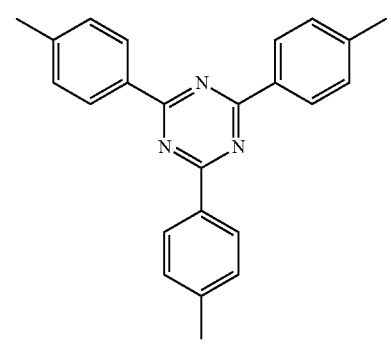
(8)

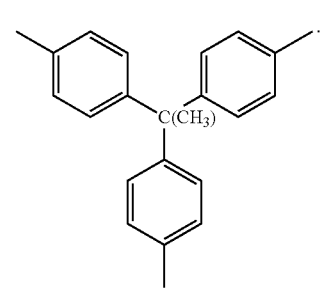
(9)

6. The solid polymer fuel cell according to claim 4, wherein the structural unit represented by said formula (6) is obtained

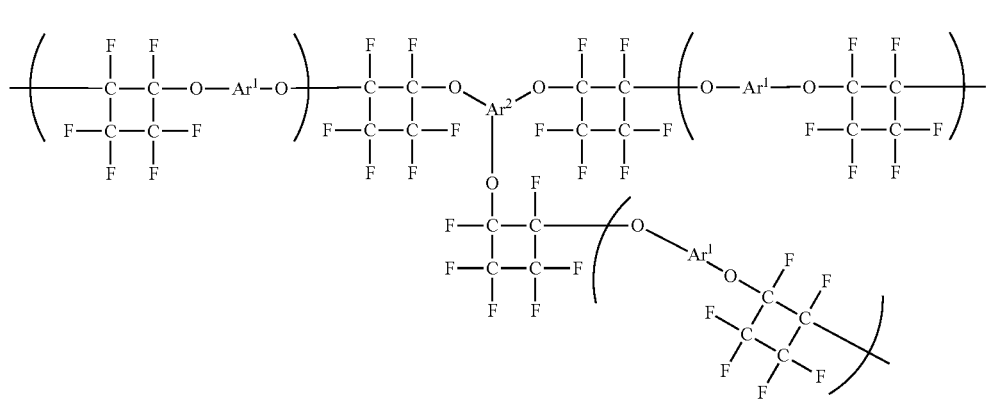
(6)

by chemical reaction of a compound represented by formula (10) with a compound represented by formula (5),

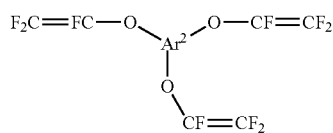

(in formula (10), $Ar^2$ is the same as $Ar^2$ of formula (6); and in formula (5), $Ar^1$ is the same as $Ar^1$ of formula (1)).

7. The solid polymer fuel cell according to claim 1, wherein said perfluorocyclobutane-containing polymer has a number average molecular weight Mn in the range of from 5,000 to 10,000,000.

8. The solid polymer fuel cell according to claim 3, wherein said perfluorocyclobutane-containing polymer has a number average molecular weight Mn in the range of from 5,000 to 10,000,000.

9. The solid polymer fuel cell according to claim 4, wherein said perfluorocyclobutane-containing polymer has a number average molecular weight Mn in the range of from 5,000 to 10,000,000.

10. The solid polymer fuel cell according to claim 1, wherein said perfluorocyclobutane-containing polymer is a homopolymer, a random copolymer, a block copolymer or a mixture thereof.

11. The solid polymer fuel cell according to claim 3, wherein said perfluorocyclobutane-containing polymer is a homopolymer, a random copolymer, a block copolymer or a mixture thereof.

12. The solid polymer fuel cell according to claim 4, wherein said perfluorocyclobutane-containing polymer is a homopolymer, a random copolymer, a block copolymer or a mixture thereof.

13. The solid polymer fuel cell according to claim 1, wherein said $Ar^1$ comprises one or two sulfonic acid groups.

14. The solid polymer fuel cell according to claim 3, wherein said $Ar^1$ comprises one or two sulfonic acid groups.

15. The solid polymer fuel cell according to claim 4, wherein said $Ar^1$ comprises one or two sulfonic acid groups.

* * * * *